United States Patent
Ichinose et al.

(10) Patent No.: US 12,104,283 B2
(45) Date of Patent: Oct. 1, 2024

(54) NETWORKED POLYMERIC NANOFIBERS, PROCESS FOR PRODUCING SAME, GAS ADSORBENT, AND GAS SEPARATION MATERIAL

(71) Applicant: NATIONAL INSTITUTE FOR MATERIALS SCIENCE, Ibaraki (JP)

(72) Inventors: Izumi Ichinose, Ibaraki (JP); Xinsheng Peng, Ibaraki (JP); Sadaki Samitsu, Ibaraki (JP); Rui Zhang, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 1270 days.

(21) Appl. No.: 16/701,553

(22) Filed: Dec. 3, 2019

(65) Prior Publication Data
US 2020/0102670 A1   Apr. 2, 2020

Related U.S. Application Data

(62) Division of application No. 13/635,735, filed as application No. PCT/JP2011/053035 on Feb. 14, 2011, now abandoned.

(30) Foreign Application Priority Data

Mar. 18, 2010   (JP) ................ 2010-062137

(51) Int. Cl.
*D01D 5/00* (2006.01)
*B01D 53/02* (2006.01)
(Continued)

(52) U.S. Cl.
CPC .............. *D01D 5/00* (2013.01); *B01D 53/02* (2013.01); *B01J 20/262* (2013.01);
(Continued)

(58) Field of Classification Search
CPC ..... B29C 67/202; D01F 1/00; D01F 6/00–96; C08J 9/26; C08J 2201/048–0484; C08J 9/28; D01D 5/00
See application file for complete search history.

(56) References Cited

U.S. PATENT DOCUMENTS 3,620,806 A * 11/1971 Kohne, Jr. ............... B05D 5/02
428/315.7
4,673,695 A   6/1987 Aubert et al.
(Continued)

FOREIGN PATENT DOCUMENTS

JP   06-157807   6/1994
JP   2002-117850   4/2002
(Continued)

OTHER PUBLICATIONS

International Search Report issued May 10, 2011 in International (PCT) Application No. PCT/JP2011/053035.
(Continued)

*Primary Examiner* — Kregg T Brooks
(74) *Attorney, Agent, or Firm* — Wenderoth, Lind & Ponack, L.L.P.

(57) ABSTRACT

The invention provides networked polymeric nanofibers having a structure in which amorphous polymeric fibers are branched at multiple sites and having a diameter of from 1 nanometer to 100 nanometers.
A solution of a polymer such as polystyrene in a good solvent thereof is rapidly frozen to form a nanoscale phase-separation structure of the polymer and the frozen solvent. The networked polymeric nanofibers can then be obtained upon removing the frozen solvent.

7 Claims, 4 Drawing Sheets

(51) Int. Cl.
  *B01J 20/26* (2006.01)
  *B01J 20/28* (2006.01)
  *B01J 20/30* (2006.01)
  *B29C 35/16* (2006.01)
  *B29C 67/20* (2006.01)
  *B82Y 30/00* (2011.01)
  *B82Y 40/00* (2011.01)
  *C08J 9/26* (2006.01)
  *D01F 6/22* (2006.01)

(52) U.S. Cl.
  CPC ... *B01J 20/28007* (2013.01); *B01J 20/28023* (2013.01); *B01J 20/28057* (2013.01); *B01J 20/3085* (2013.01); *B29C 35/16* (2013.01); *B29C 67/202* (2013.01); *B82Y 30/00* (2013.01); *C08J 9/26* (2013.01); *D01F 6/22* (2013.01); *B01D 2253/202* (2013.01); *B01D 2257/504* (2013.01); *B01D 2257/7025* (2013.01); *B82Y 40/00* (2013.01); *C08J 2201/0482* (2013.01); *Y02C 20/20* (2013.01); *Y02C 20/40* (2020.08); *Y02P 70/62* (2015.11); *Y10T 428/2975* (2015.01)

(56) References Cited

U.S. PATENT DOCUMENTS

| | | |
|---|---|---|
| 5,723,508 A | 3/1998 | Healy et al. |
| 6,281,257 B1 * | 8/2001 | Ma .................. G01N 15/14 521/64 |
| 7,390,760 B1 | 6/2008 | Chen |
| 2002/0132159 A1 | 9/2002 | Ohya et al. |
| 2006/0094320 A1 | 5/2006 | Chen |
| 2006/0117730 A1 | 6/2006 | Chung |
| 2006/0188774 A1 | 8/2006 | Niu et al. |
| 2007/0082805 A1 | 4/2007 | Ohya et al. |

FOREIGN PATENT DOCUMENTS

| | | | |
|---|---|---|---|
| JP | 2002-170574 | 6/2002 | |
| JP | 2007-521843 | 8/2007 | |
| WO | WO-03033580 A2 * | 4/2003 | ............ B01J 20/26 |
| WO | 2004/103208 | 12/2004 | |

OTHER PUBLICATIONS

Branched chain. Definition by Dictionary.com. Mar. 2017.

Extended European Search Report issued Nov. 15, 2013 in corresponding European Application No. 11756016.9.

Office Action issued Jun. 20, 2017 in corresponding European Application No. 11756016.9.

Aubert, "Isotactic polystyrene phase diagrams and physical gelation", Macromolecules, vol. 21, No. 12, 1988, pp. 3468-3473.

Aubert et al., "Low-density, microcellular polystyrene foams", Polymer, vol. 26, No. 13, 1985, pp. 2047-2054.

Liu et al., "Phase separation, pore structure, and properties of nanofibrous gelatin scaffolds", Biomaterials, vol. 30, No. 25, 2009, pp. 4094-4103.

Nam et al., "Biodegradable polymeric microcellular foams by modified thermally induced phase separation method", Biomaterials, vol. 20, No. 19, 1999, pp. 1783-1790.

Ho et al., "Preparation of porous scaffolds by using freeze-extraction and freeze-gelation methods", Biomaterials, vol. 25, No. 1, 2004, pp. 129-138.

* cited by examiner

NETWORKED POLYMERIC NANOFIBERS, PROCESS FOR PRODUCING SAME, GAS ADSORBENT, AND GAS SEPARATION MATERIAL

TECHNICAL FIELD

The present invention relates to polymeric nanofibers of a networked structure having branches at multiple sites, processes for producing the same, and gas adsorbents and gas separation materials using such networked polymeric nanofibers.

BACKGROUND ART

Polymeric nanofibers formed by spinning and that do not have a networked structure have generally been used in a wide range of applications as nanomaterials having a large specific surface area. Large specific surface area is advantageous for the adsorption and absorption of gases and solutions, and provides excellent performance for separation functional materials, catalyst supports, and the like. Further, when formed on a film, nanofibers having no networked structure have use in a wide range of industrial or biological/environmental fields, including high-performance filters, microfiltration membranes, and lithium battery separators.

Ultrafine polymeric nanofibers with no networked structure can be formed by melt-spinning a blend polymer. Island polymers nanodispersed in a blend polymer of a sea-island structure produce polymeric nanofibers of an about 60-nm diameter having no networked structure, and such nanofibers can be processed into a product such as a nonwoven fabric in post-processes. (See Non-Patent Document 1 reporting fabrication of polymeric nanofibers of an about 60-nm diameter having no networked structure by using a melt-spinning technique.)

Polymeric nanofibers having no networked structure also can be formed by electrospinning. In this technique, a polymer solution is expelled onto a substrate through a nozzle tip under applied high voltage to deposit the polymer in fibers. (See Non-Patent Document 2 that reviews fabrication of nanofibers with no networked structure by electrospinning.) Electrospinning is applicable to various polymers, and typically produces fibers having a diameter of from about 50 nanometers to about 1 micrometer. A drawback of electrospinning, however, is the exceedingly slow spinning speed, and the tendency to form granules when the fiber diameter is to be reduced. Applicable areas of electrospinning are thus limited to mainly medical applications such as in polymeric nanofiber nonwoven fabrics having high biocompatibility.

Processes that use an inorganic template for the production of polymeric nanofibers having no networked structure have been reported in many academic journals. For example, polymeric nanofibers having a diameter of from several nanometers to several ten nanometers can be obtained when the columnar pores inside an anodized alumina film or a mesoporous material are used as a reaction field. Aida et al. proposes a polymerization method in which a polymerization catalyst is immobilized inside the nanopores of a mesoporous material for extrusion of polymer chains from the pores. (See Non-Patent Document 3 reporting fabrication of polyethylene nanofibers with the use of a mesoporous material.) This technique produces crystalline polyethylene fibers of an about 30- to 50-nm diameter having no networked structure.

In biopolymers such as collagen, nanofibers with no networked structure are formed by self-assembly. Such nanofibers are highly biodegradable, and are used in food and medical applications.

Nanofibers with no networked structure are also formed by self-assembly in conductive polymers having a polythiophene main chain, and polymeric nanofibers having no networked structure and having a diameter of 30 nanometers or less, and a thickness of 5 nanometers or less are obtained. (See Non-Patent Document 4 reporting fabrication of nanofibers from a polymer that has polythiophene in the main chain.)

In electrospinning, a nonwoven fabric is obtained as a stack of polymeric nanofibers having no networked structure. Because each nanofiber is independently formed, the nanofibers are merely physically in contact with one another.

Similarly, nanofibers are merely in physical contact with one another in melt-spinning or when a template such as a mesoporous material is used, because the nanofibers having no networked structure are independently formed. In this case, the nanofibers having no networked structure tend to form a bundle of nanofiber assembly, or a threadlike structure (called a yarn) as a collection of such an assembly bundle.

The physical contact of the individual nanofibers having no networked structure also occurs in polymeric nanofibers formed by self-assembly such as in biopolymers. In this case, the individual nanofibers independently grow in a solution.

Thus, even when the nanofibers appear tangled, in truth, the individual nanofibers are simply physically in contact with one another. Such tangling resulting from the physical contact of the nanofibers can often be confirmed by the occurrence of gelation in a solution.

Unlike the form of the nanofibers of no networked structure undergoing independent growth, there are polymeric nanofibers having a networked structure. As used herein, networked structure refers to a structure in which nanofibers branched at multiple sites are joined to one another three-dimensionally (or two-dimensionally). Specifically, the polymeric nanofibers locally having a fibrous structure are continuously joined to one another.

Such structures are seen in polymeric fibers formed by phase separation. For example, in the thermally induced phase separation (TIPS) technique that induces phase separation by cooling, a polymer solution undergoes spinodal decomposition to form networked polymeric fibers. In actual practice, networked polymeric fibers having a diameter of about 1 micrometer are obtained by cooling an about 4% cyclohexanol solution of polystyrene to about 80° C. after heating the solution. (See Non-Patent Document 5 reporting fabrication of polymeric fibers of an about 1-µm diameter by cooling a cyclohexanol solution of polystyrene to about 80° C. after heating the solution.) However, it is extremely difficult to obtain polymeric fibers having a diameter of 100 nanometers or less in the common fabrication that makes use of liquid-liquid phase separation.

SUMMARY OF INVENTION

Problems that the Invention is to Solve

It is an object of the present invention to provide networked polymeric nanofibers configured from amorphous fibers and having a diameter of from 1 nanometer to 100 nanometers, a process for producing the same, and products using such nanofibers.

Means for Solving the Problems

According to an aspect of the present invention, there is provided a networked polymeric nanofiber having a diameter of from 1 nanometer to 100 nanometers, and having a structure in which amorphous polymeric fibers are branched at multiple sites.

The networked polymeric nanofiber may have a specific surface area of from 10 $m^2/g$ to 1,000 $m^2/g$.

The amorphous polymer may be one or more compounds selected from the group consisting of polystyrene, polycarbonate, poly(2,6-dimethyl-p-phenyleneoxide), polysulfone, poly(p-phenylene ether-sulfone), polyacrylonitrile, polyetherimide, and polyvinyl chloride.

According to another aspect of the present invention, there is provided a process for producing a networked polymeric nanofiber, the process including the steps of:
 (a) dissolving an amorphous polymer in a good solvent thereof to obtain a polymer solution;
 (b) rapidly freezing the amorphous polymer solution to form a nanoscale phase-separation structure of the polymer and solidified solvent molecules; and
 (c) removing the good solvent from the frozen amorphous polymer solution.

The step of removing the good solvent may include a step of displacing the good solvent with a poor solvent of the amorphous polymer.

The poor solvent may be methanol.

The solvent displacing step may include a step of increasing temperature in a stepwise manner.

The step of removing the good solvent may further include a step of performing solvent exchange.

The solvent exchange may be performed by using the poor solvent or butanol.

The step of removing the good solvent may include a step of performing freeze drying, or vacuum drying at a temperature no greater than the glass transition point of the amorphous polymer.

The amorphous polymer may be one or more compounds selected from the group consisting of polystyrene, polycarbonate, poly(2,6-dimethyl-p-phenyleneoxide), polysulfone, poly(p-phenylene ether-sulfone), polyacrylonitrile, polyetherimide, and polyvinyl chloride.

The good solvent may be one or more compounds selected from the group consisting of benzene, carbon tetrachloride, chlorobenzene, chloroform, cyclohexanone, o-dichlorobenzene, dimethylformamide, 1-methyl-2-pyrrolidone, nitrobenzene, 1,1,2,2-tetrachloroethane, and p-xylene.

According to yet another aspect of the present invention, there is provided a gas adsorbent that uses the networked polymeric nanofiber.

According to still another aspect of the present invention, there is provided a gas separation material that uses the networked polymeric nanofiber.

According to yet another aspect of the present invention, there is provided an organic molecule removing agent that uses the networked polymeric nanofiber.

Advantage of the Invention

The networked polymeric nanofibers provided by the present invention are materially amorphous, and have a very large specific surface area. The networked polymeric nanofibers thus exhibit excellent gas adsorption characteristics. Further, because the amorphous polymeric nanofibers absorb large amounts of gas under high pressure, the networked polymeric nanofibers exhibit gas adsorption (or absorption) characteristics with large pressure dependence. Further, because the nanofibers in the networked polymeric nanofibers of the present invention are continuously joined to one another, the networked polymeric nanofibers have excellent mechanical strength, and the continuous network structure is not destroyed by pressure changes. Further, by being amorphous, the networked polymeric nanofibers are capable of adsorbing (or absorbing) gas in a highly selective fashion, and can thus provide an excellent gas separation material. The networked polymeric nanofibers also have characteristics as a removing agent for efficiently removing an organic molecule from an aqueous solution.

MODE FOR CARRYING OUT THE INVENTION

In the present invention, polymeric nanofibers with a diameter of from 1 nanometer to 100 nanometers and having a networked structure branched at multiple sites can be formed by solidifying the solvent of a polymer solution at the nanoscale by rapid freezing, without causing liquid-liquid phase separation in the polymer solution. Generally, formation of nanofibers by liquid-liquid phase separation involves gelling of the polymer solution with the maintained solvent mobility. In the present invention, however, the polymeric nanofibers are formed not by gelling the solvent but by solidifying (freezing) the solvent, and thus the solvent does not exist in the liquid state around the fibers while the polymeric nanofibers are being formed.

In a study similar to the present invention, Aubert fabricates polymeric nanofibers of an about 50-nm diameter from a nitrobenzene solution by using crystalline isotactic polystyrene. (See Non-Patent Document 6 reporting fabrication of crystalline polymeric nanofibers from a nitrobenzene solution of isotactic polystyrene by using the TIPS technique.) However, the polymeric nanofibers are crystallized, and do not represent amorphous nanofibers.

Further, the isotactic polystyrene used in the study is insoluble in nitrobenzene at ordinary temperature, and the polymer solution is produced by being heated to 175° C. in this report. Cooling the solution to a temperature in the vicinity of room temperature causes liquid-liquid phase separation in the polymer solution, and the polymer solution gels. Here, because the isotactic polystyrene crystallizes in a high-polymer-concentration phase, it gives a false perception that networked polymeric nanofibers are formed. However, the nanofibers are actually non-continuous, strut-shaped (columnar) nanofibers of crystalline polymers, and do not represent networked polymeric nanofibers.

In the experiments conducted by Aubert, polymeric nanofibers are not formed when the solvent freezes, or when non-crystalline atactic polystyrene is used. Specifically, crystallization of the isotactic polystyrene in a nitrobenzene solution is essential for nanofiber formation.

In another study similar to the present invention, Ma et al. fabricates polylactic acid nanofibers of a diameter ranging from 500 nanometers to 50 nanometers by using the TIPS technique. However, the nanofibers produced are not networked polymeric nanofibers.

(See Non-Patent Document 7 reporting fabrication of crystalline polymeric nanofibers from a tetrahydrofuran solution of polylactic acid by using the TIPS technique.) This study uses an L-form polylactic acid (poly-L-lactic acid), a known crystalline polymer. The crystalline polymeric nanofibers individually grow when the polymer solution is gelled by lowering the temperature of the polymer solution. The nanofibers produced thus do not have a network structure branched at multiple sites.

The structural characteristics of the polymeric nanofibers of the present invention include a diameter of 100 nanometers or less, preferably less than 50 nanometers, and a network structure branched at multiple sites.

Another characteristic of the networked polymeric nanofibers of the present invention is that the nanofibers are amorphous. In the present invention, the nanofibers are obtained from polymers, such as polycarbonate, that can assume the amorphous state in a bulk, and the crystallinity of the product polymeric nanofibers ranges from 0% to 10%. Here, the crystallinity is not limited to 0%, and instead ranges from 0% to 10%. This is because, generally, amorphous polymers may produce nanofibers that partially include a crystal-like ordered structure, which may be observed when advanced measurement techniques, such as high-energy synchrotron or atomic force microscopy, are used. Thus, the term "amorphous" as used herein means a crystallinity of from 0% to 10%. (Nanofibers of the polymers having a low crystallization rate, and that can be obtained without using special procedures and without being crystallized are also defined as "amorphous" in the present application, as will be described later.)

In the producing process of the present invention, a polymer is dissolved in a good solvent, and the solvent is solidified at nanoscale by rapid freezing. Here, it is not necessarily required to select a solvent that causes liquid-liquid phase separation at low temperature. However, it is important to select a good solvent that can provide a homogeneous solution even under cooling, and that does not cause phase separation until the solvent solidifies. The freezing speed is important, and it is preferable to cool the polymer solution at once under a large temperature gradient in a thickness of about several millimeters.

The following specifically describes the networked polymeric nanofiber producing process of the present invention, and the properties of the networked polymeric nanofibers.

The networked polymeric nanofibers of the present invention are obtained from amorphous polymers such as atactic polystyrene (hereinafter, simply "polystyrene"), polycarbonate, polysulfone, poly(2,6-dimethyl-p-phenyleneoxide), poly(p-phenylene ether-sulfone), polyacrylonitrile, polyetherimide, and polyvinyl chloride. The networked polymeric nanofibers cannot be obtained from polymers having large crystallinities, such as isotactic polystyrene, L-form polylactic acid, polyamide, and polyethylene.

This is because crystalline nanofibers are formed in the process of cooling the polymer solution. Table 1 summarizes non-limiting examples of amorphous polymers in which formation of the networked polymeric nanofibers was confirmed. It should be noted that even polymers generally recognized as crystalline polymers may require extension or other special procedures for crystallization when the crystallization rate is considerably slow for reasons such as large molecular weight. In the present invention, such polymers are also defined as to be amorphous polymeric nanofibers, because crystallization from the solution hardly occurs by rapid cooling.

In the present invention, an amorphous polymer is first dissolved in a good solvent. Preferably, the good solvent has high solubility for the polymer. For example, in the case of polystyrene, solvents such as chloroform and benzene can be used as good solvents. Table 2 summarizes non-limiting examples of solvents in which formation of the networked polymeric nanofibers was confirmed. Further, in the present invention, a mixture of more than one solvent also may be used as the good solvent.

The polymer concentration may be selected from 1% to 50%, and a range of 10% to 30% is suitably used. Formation of a developed network structure becomes difficult with 1% or lower concentrations, and it becomes difficult to dissolve the polymer with 50% or greater concentrations.

In the present invention, the polymer solution is rapidly frozen to form the nanofibers. Rapid cooling may be performed by using a number of methods. It is, however, required to make the polymer solution in the shape of fine particles, fibers, or a thin film, and increase the temperature gradient. When the polymer solution is cooled by using a method such as dipping a glass container in a refrigerant (such as liquid nitrogen, and dry ice), it is preferable that the thickness of the polymer solution from the wall surface be 1 centimeter or less, more preferably several millimeters. For freezing, the polymer solution may be brought into direct contact with the refrigerant (for example, liquid nitrogen, dry ice, a poor solvent cooled with dry ice). The optimum freezing speed differs depending on the polymer, the solvent, and the concentration, and cannot be specified definitively. Typically, solutions of lower concentrations require more rapid cooling. When cooling a 30% polymer solution having a thickness of 1 mm, the time required to solidify the solution is preferably within 3 minutes, more preferably within 30 seconds.

When the cooling rate of the polymer solution is slow, the solvent grows into large crystals of a micrometer scale, and the polymer moves as the solvent undergoes the crystalline growth. However, when a uniformly dispersed polymer solution is rapidly cooled, the solvent solidifies before it grows into large crystals, and the polymer moves over the distance of several nanometers. Specifically, a nanoscale phase-separation structure of the polymer and the solidified solvent molecule is formed. Here, the polymer phase forms a network structure of nanofibers having a diameter of several ten nanometers. The mechanism of network structure formation has not been fully elucidated. However, because the polymer chains are tangled in the polymer solution, it is believed that the networked structure is formed as the solvent solidifies, or in the solidified state of the solvent.

In the present invention, the frozen solvent is removed after freezing the polymer solution. The solvent may be removed by using methods such as freeze drying and solvent displacement. In freeze drying, a high-density layer (skin layer) may form on the surface of samples. On the other hand, the solvent displacement method is preferably used, because it does not form the skin layer. Generally, the poor solvent is cooled in advance, and contacted to a frozen polymer solution. For example, a chloroform solution of polystyrene is frozen, and contacted with methanol (poor solvent) cooled to −77° C. with dry ice. As a result, the solidified chloroform is extracted into the methanol. The extraction time depends on the thickness of the frozen sample, and one week is suitable for 1-cm thickness. The extraction time may be shortened by gradually increasing the extraction temperature. More than one poor solvent may be used in combination for the solvent extraction.

After extracting the good solvent from the frozen sample, the poor solvent inside the networked polymeric nanofibers is further exchanged with other poor solvent. The solvent exchange can remove trace amounts of the good solvent dissolved inside the nanofibers.

Note that, in the present invention, the exchange of the solvent using methanol or butanol at room temperature is referred to as "solvent exchange" to distinguish it from the "solvent displacement" described above.

One or more runs of solvent exchange are followed by freeze drying, or vacuum drying under heat to fabricate the polymeric nanofibers.

The freezing of the polymer solution, and the solvent displacement and exchange may be appropriately modified within the gist of the present invention. For example, the polymer solution may be frozen instantaneously by being poured into a poor solvent cooled with dry ice, and this may be directly followed by gradual solvent displacement. Further, the solvent displacement and the solvent exchange may be continuously performed in one procedure with large amounts of solvent. Freeze drying or vacuum drying may be omitted when the poor solvent easily evaporates.

The networked polymeric nanofibers produced as above have a diameter in a range of 1 nanometer to 100 nanometers, with many of the nanofibers falling in a diameter range of from 5 nanometers to 50 nanometers. Often, the nanofibers are obtained in a diameter range of from 10 nanometers to 20 nanometers.

Because of the small diameter and the considerably narrow diameter distribution, the networked polymeric nanofibers of the present invention have a large specific surface area. The specific surface area ranges from 10 $m^2/g$ to 1,000 $m^2/g$, with many of the nanofibers falling in a range of 30 $m^2/g$ to 300 $m^2/g$. The specific surface area can generally be measured by using the nitrogen BET technique. Note, however, that the specific surface area varies in a manner that depends on the type of the adsorbed gas, and, when carbon dioxide is adsorbed, the specific surface area may have a value twice as large as that determined from nitrogen. This is because the amorphous polymer forming the nanofibers has different molecular motions at the temperature (in the vicinity of −78° C.) used in a carbon dioxide adsorption experiment and at the temperature (in the vicinity of −196° C.) used in a nitrogen adsorption experiment.

By comparing the adsorption amounts of carbon dioxide in the vicinity of −78° C. and of nitrogen at the liquid nitrogen temperature in the networked polymeric nanofibers of the present invention, the adsorption amount of carbon dioxide may be several times as much as that of nitrogen in terms of a weight ratio in polymers such as polystyrene and polyphenylene oxide (PPO) (see Table 8).

In the networked polymeric nanofibers of the present invention, the carbon dioxide adsorption amount increases with increase in carbon dioxide pressure in the vicinity of room temperature. Under 1-megapascal pressure, carbon dioxide is adsorbed in 5% to 10% of the nanofibers in terms of a weight ratio. On the other hand, under 0.1-megapascal (almost ordinary pressure), most of the adsorbed carbon dioxide is desorbed. The adsorption and desorption of carbon dioxide may be performed repeatedly. Further, adsorption and desorption may be repeated by varying the pressure not only for carbon dioxide but for other gases having affinity to the polymer chains. The networked polymeric nanofibers of the present invention can thus be used as a gas adsorbent or a gas separation material (see Tables 9 and 10).

Further, the networked polymeric nanofibers of the present invention adsorb large amounts of the vapor from the good solvent. The adsorption amount may exceed 100% of the nanofibers in terms of a weight ratio in the vicinity of room temperature (see Table 11).

By being dipped in water, the networked polymeric nanofibers of the present invention also can efficiently adsorb organic molecules dissolved in water. For example, in the case of polycarbonate nanofibers, an about half of pyridine in a 10 ppm pyridine aqueous solution can be adsorbed even for pyridine which can mix with water in any proportions. The networked polymeric nanofibers of the present invention can thus be used as an efficient organic molecule removing agent both in a gaseous phase and a liquid phase.

EXAMPLES

The polymers and solvents used in Examples are presented in Tables 1 and 2 below along with their basic properties.

TABLE 1

Polymers used

| Polymer | Abbr. | CAS No. | Provider | Molecular weight | d (g/cm$^3$) | $T_g$ (° C.) | $T_m$ (° C.) |
|---|---|---|---|---|---|---|---|
| Polystyrene | PS | 9003-53-6 | Wako Chemical | 200,000 | 1.05 | 100 | — |
| Polycarbonate | PC1 | 103598-77-2 | Scientific Polymer | 60,000 | 1.20 | 149 | — |
| Polycarbonate | PC2 | 103598-77-2 | Scientific Polymer | 36,000 | 1.20 | 149 | — |
| Poly(2,6-dimethyl-p-phenyleneoxide) | PPO | 25134-01-4 | Scientific Polymer | 50,000 | 1.06 | 210 | 215 |
| Polysulfone | PSf | 25154-01-2 | Scientific Polymer | 60,000 | 1.24 | 190 | 230 |
| Poly(p-phenylene ether-sulfone) | PES | 25608-63-3 | Scientific Polymer | N.D. | 1.37 | N.D. | N.D. |
| Polyacrylonitrile | PAN | 25014-41-9 | Scientific Polymer | 150,000 | 1.184 | 125 | 314 |
| Polyetherimide | PEI | 61128-46-9 | Poly Science | 30,000 | 1.27 | 217 | — |
| Polyvinyl chloride | PVC | 9002-86-2 | Scientific Polymer | 275,000 | 1.40 | 85 | 285 |

Reference: Polymer density (d), glass transition point (Tg), and melting point (Tm) were drawn from Scientific Polymer catalog.

TABLE 2

Solvents used and properties

| Solvent | abbr. | CAS No. | Provider | Purity | Molecular weight | $T_m$(° C.) | SP value (MPa1/2) |
|---|---|---|---|---|---|---|---|
| Benzene | Bz | 71-43-2 | Kanto Chemical | >99.5% | 78.11 | 6 | 18.8 |
| Carbon tetrachloride | CCl4 | 56-23-5 | Kanto Chemical | >99.5% | 153.82 | −23 | 17.6 |
| Chlorobenzene | BzCl | 108-90-7 | Kanto Chemical | >99.5% | 112.56 | −45 | 19.4 |
| Chloroform | CHCl3 | 67-66-3 | Kanto Chemical | >99.0% stabilized with ethanol | 119.38 | −63 | 19.0 |
| Cyclohexanone | C6H10O | 108-94-1 | Kanto Chemical | >99.0% | 98.15 | −47 | 20.3 |
| o-Dichlorobenzene | oDCB | 95-50-1 | Kanto Chemical | >99.0% | 147 | −17 | 20.5 |
| Dimethylformamide | DMF | | Kanto Chemical | >99.5% | 73.1 | −61 | 24.8 |
| 1-Methyl-2-pyrrolidinone | NMP | 872-50-4 | Kanto Chemical | >99.0% | 99.13 | −24 | 23.1 |
| Nitrobenzene | BzNO2 | 98-95-3 | Kanto Chemical | >99.5% | 123.11 | 6 | 20.5 |
| 1,1,2,2-Tetrachloroethane | TCE | 79-34-5 | Kanto Chemical | >97.0% | 167.85 | −45 | 19.8 |
| p-Xylene | Xylene | 106-42-3 | Kanto Chemical | >98.0% | 106.17 | 13 | 18.0 |

Melting point (Tm) and SP value were drawn from The Polymer Handbook, 4th ed..

Example 1

In Example 1, networked polymeric nanofibers were fabricated by solvent displacement from the frozen state, using polystyrene (PS) solutions with various good solvents.

A benzene solution (10 g) containing 10 wt % PS (molecular weight of 200,000) was prepared in a glass container (110 mL). The glass container was dipped in liquid nitrogen (−196° C.) for at least 15 min to freeze the solution on the wall surface of the container. Methanol (100 mL) cooled to −77° C. or lower was added at once to the container, and the sample temperature was increased in a stepwise fashion while maintaining the temperature at −77° C. (7 days), −20° C. (5 days), +5° C. (6 days), and room temperature (20° C. to 25° C., half a day). The polymeric nanofiber structure is fixed by first displacing the good solvent with methanol at low temperature. The methanol used as a poor solvent of PS has a melting point of −97° C., and remains in the liquid state even at the lowest retention temperature (−77° C.) of the solvent displacement procedure. The solvent was further exchanged with another methanol (100 mL) at room temperature for 4 days, and then with t-butanol (100 mL) for 4 days before being freeze dried under reduced pressure. This was followed by vacuum drying at a temperature equal to or lower than the glass transition point of PS to completely remove the solvent and obtain solvent-free networked polymeric nanofibers. Nanofiber structures were also fabricated from PS solutions dissolving good solvents (carbon tetrachloride, monochlorobenzene, chloroform, dimethylformamide, tetrachloroethane, and xylene) having melting points above the lowest retention temperature (−77° C.). Table 3 presents the good solvents used in the experiments, and the diameters of the resulting nanofibers. (Note that the diameter is given as the diameter of a corresponding circle having the same cross sectional area as the nanofibers, because the cross sectional shape of the nanofibers is not necessarily a true circle.) The nanofiber diameter ranged from 9 nm to 21 nm.

TABLE 3

Fabrication of networked polymeric nanofibers by solvent displacement from frozen state

| Experiment No. | Good solvent | Diameter (nm) |
|---|---|---|
| P1-1 | Bz | 19 |
| P1-2 | CCl4 | 14 |
| P1-3 | BzCl | 15 |
| P1-4 | CHCl3 | 11 |
| P1-5 | DMF | 19 |
| P1-6 | TCE | 9 |
| P1-7 | Xylene | 21 |

Figure 1:
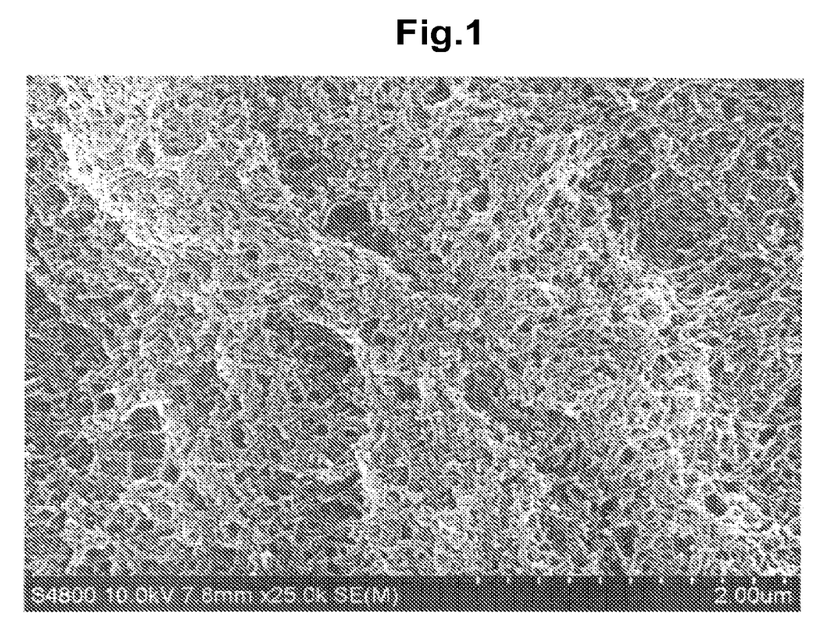
FIG. 1 represents an SEM of a sample with experiment number P1-1 (magnification: ×25,000).
Figure 2:
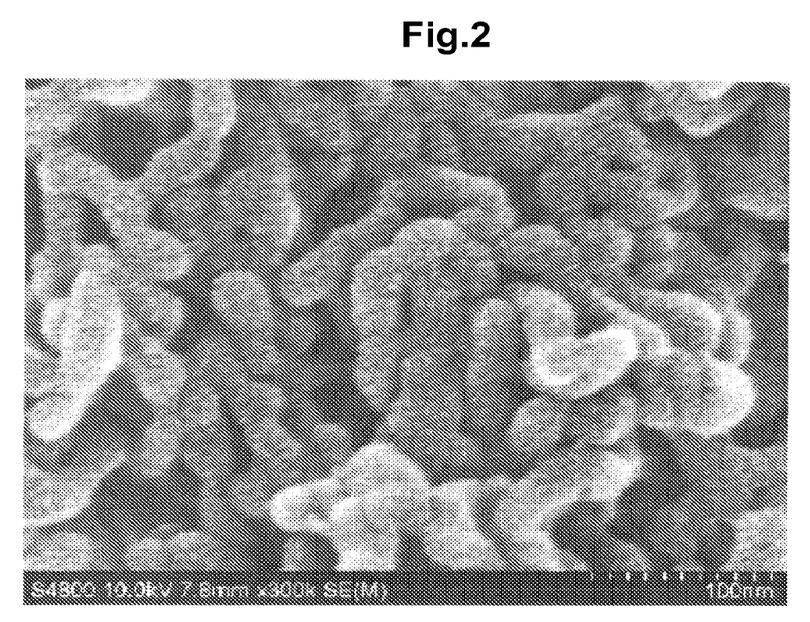
FIG. 2 represents an SEM of a sample with experiment number P1-1 (magnification: ×300,000).

FIG. 1 represents an electron scanning micrograph (SEM) of a cross section of a sample with experiment number P1-1. FIG. 2 represents an SEM of the same sample taken at a higher magnification. It can be seen from these images that the polymer solid was formed from networked fibers having nanoscale diameters. The fiber diameter as determined from the observation of the fibers at 10 locations was 26 nm or less. The average nanofiber diameter from these 10 locations was 19 nm. The diameters presented in Tables 3 to 5 were estimated by SEM observation after vapor depositing a 5-nm Pt thin film to impart conductivity. It should therefore be noted that the diameters in the tables do not take into account the thickness of the Pt thin film, and the actual diameters may be smaller.

Example 2

In Example 2, networked polymeric nanofibers were fabricated by solvent displacement from the frozen state, using PS solutions of varying concentrations with different good solvents.

Polystyrene (PS; molecular weight of 200,000) was dissolved in a good solvent in 10 wt % to 30 wt % in a glass container (110 mL). The glass container with the solution (10 g) was dipped in liquid nitrogen (−196° C.) for at least 15 min to freeze the solution on the wall surface of the container. Methanol (100 mL) cooled to −77° C. or lower was then added at once to the container, and the sample temperature was increased in a stepwise fashion while maintaining the temperature at −77° C., −20° C., +5° C., and room temperature (20° C. to 25° C.) for predetermined time periods. The solvent was exchanged with another methanol (100 mL) at room temperature, and then with t-butanol (100 mL) before being freeze dried under reduced pressure. This was followed by vacuum drying at a temperature equal to or lower than the glass transition point to completely remove the solvent and obtain solvent-free networked polymeric nanofibers. Table 4 presents the good solvents, the PS concentrations, the solvent displacement times, and the solvent exchange times used in the experiments, along with the diameters of the nanofibers obtained. The nanofiber diameter ranged from 10 nm to 19 nm. In the table, "MeOH" and "t-BuOH" used for the solvent exchange at room temperature represent methanol and t-butanol, respectively.

SEM observation confirmed networked fibers having nanoscale diameters as in FIG. 1. The nanofiber diameter was 18 nm.

Example 4

In Example 4, networked polymeric nanofibers were fabricated by using various polymers.

A $CHCl_3$, DMF, TCE, $BzNO_2$, or NMP solution (10 g) containing a 10 wt % polymer (PC, PSf, PES, PPO, PAN, PEI, or PVC) was prepared in a glass container (110 mL). The glass container was dipped in liquid nitrogen (−196° C.) for at least 15 min to freeze the solution on the wall surface of the container. Methanol (100 mL) cooled to −77° C. or

TABLE 4

Fabrication of networked polymeric nanofibers from PS solutions of various concentrations using various good solvents

| Experiment No. | Good solvent | Concentration (wt %) | Solvent displacement | | | | Solvent exchange (R.T.) | | Diameter (nm) |
|---|---|---|---|---|---|---|---|---|---|
| | | | −77° C. | −20° C. | +5° C. | R.T. | MeOH | t-BuOH | |
| P2-1 | Bz | 10 | 6 h | 4 d | 3 d | 1 d | 1 d | 2 d | 19 |
| P2-2 | Bz | 20 | 3 h | 3 d | 2 d | 1 d | 1 d | 3 d | 16 |
| P2-3 | Bz | 30 | 3 h | 3 d | 2 d | 1 d | 1 d | 3 d | 13 |
| P2-4 | oDCB | 30 | 6 d | 8 d | 5 d | 0.5 d | 14 d | 6 d | 12 |
| P2-5 | DMF | 30 | 6 d | 8 d | 5 d | 0.5 d | 14 d | 6 d | 14 |
| P2-6 | CHCl3 | 30 | 6 d | 8 d | 5 d | 0.5 d | 14 d | 6 d | 12 |
| P2-7 | BzCl | 30 | 6 d | 8 d | 5 d | 0.5 d | 14 d | 6 d | 10 |
| P2-8 | C6H10O | 30 | 6 d | 8 d | 5 d | 0.5 d | 14 d | 6 d | 14 |
| P2-9 | TOE | 30 | 6 d | 8 d | 5 d | 0.5 d | 14 d | 6 d | 11 |
| P2-10 | BzNO2 | 30 | 6 d | 8 d | 5 d | 0.5 d | 14 d | 6 d | 12 | h and d under Solvent displacement and Solvent exchange are hours and days, respectively.
R.T. (Room temperature) means 20° C. to 25° C..
MeOH: Methanol; t-BuOH: t-Butanol Example 3

Figure 3:
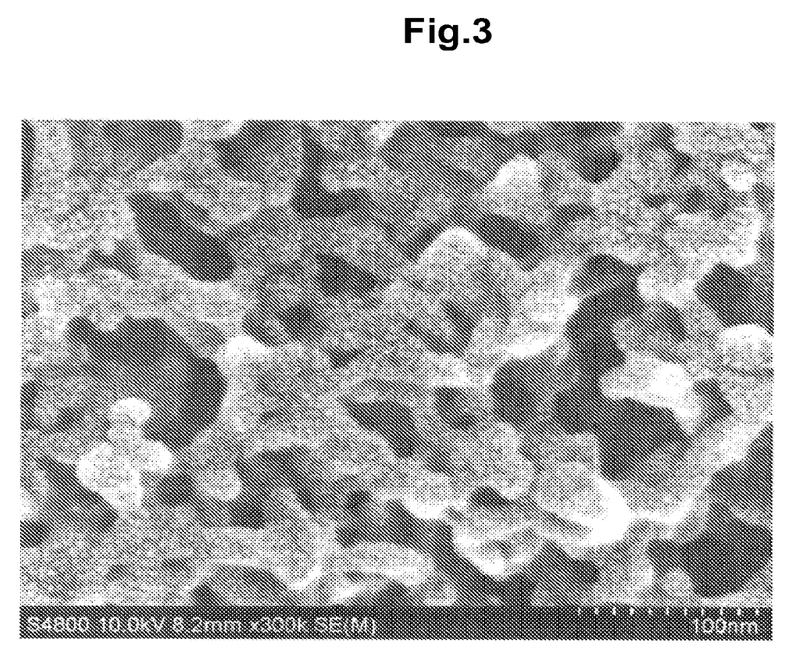
FIG. 3 represents an SEM of a sample with experiment number P4-12 (magnification: ×300,000).

In Example 3, networked polymeric nanofibers were fabricated by freeze drying. A benzene solution (10 g) containing 10 wt % polystyrene (PS; molecular weight of 200,000) was prepared in a glass container (110 mL). The glass container was dipped in liquid nitrogen (−196° C.) for at least 15 min to freeze the solution on the wall surface of the container. The container was then freeze dried under reduced pressure for 3 days. This was followed by vacuum drying at a temperature equal to or less than the glass transition point to completely remove the solvent and obtain solvent-free networked polymeric nanofibers (sample number P3-1 in Table 6).

lower was then added at once to the container, and the sample temperature was increased in a stepwise fashion while maintaining the temperature at −77° C., −20° C., +5° C., and room temperature (20° C. to 25° C.) for predetermined time periods. The solvent was freeze dried after the predetermined solvent exchange using another methanol (100 mL) and t-butanol (100 mL) at room temperature. This was followed by vacuum drying at a temperature equal to or lower than the glass transition point to completely remove the solvent and obtain solvent-free networked polymeric nanofibers. Networked polymeric nanofibers were also fabricated from 20 wt % solutions in the same manner. Table 5 presents the polymers, the good solvents, the concentrations, the solvent displacement times, and solvent exchange times used in the experiments, along with the diameters of the nanofibers obtained. The nanofiber diameter ranged from 9 nm to 22 nm. FIG. 3 represents an SEM of a cross section of the sample with sample number P4-12.

TABLE 5

Fabrication of networked polymeric nanofibers from various polymers

| Experiment No. | Polymer | Good solvent | Concentration (wt %) | Solvent displacement | | | | Solvent exchange (R.T.) | | Diameter (nm) |
|---|---|---|---|---|---|---|---|---|---|---|
| | | | | −77° C. | −20° C. | +5° C. | R.T. | MeOH | t-BuOH | |
| P4-1 | PC1 | CHCl3 | 10 | 3 d | 4 d | 2 d | 0.5 d | — | 3 d | 22 |
| P4-2 | PC2 | CHCl3 | 10 | 3 d | 4 d | 2 d | 0.5 d | — | 3 d | 13 |
| P4-3 | PC1 | CHCl3 | 20 | 3 d | 4 d | 2 d | 0.5 d | — | 3 d | 13 |
| P4-4 | PC2 | CHCl3 | 20 | 3 d | 4 d | 2 d | 0.5 d | — | 3 d | 12 |
| P4-5 | PSf | CHCl3 | 20 | 5 d | 6 d | 6 d | 1 d | 4 d | 3 d | 16 |
| P4-6 | PSf | DMF | 10 | 5 d | 6 d | 6 d | 1 d | 4 d | 3 d | 21 |

TABLE 5-continued

Fabrication of networked polymeric nanofibers from various polymers

| Experiment No. | Polymer | Good solvent | Concentration (wt %) | Solvent displacement | | | | Solvent exchange (R.T.) | | Diameter (nm) |
|---|---|---|---|---|---|---|---|---|---|---|
| | | | | −77° C. | −20° C. | +5° C. | R.T. | MeOH | t-BuOH | |
| P4-7 | PSf | TCE | 10 | 4 d | 5 d | 5 d | 1 d | 4 d | 1 d | 15 |
| P4-8 | PSf | DMF | 20 | 5 d | 5 d | 10 d | 2 d | 14 d | 4 d | 13 |
| P4-9 | PSf | oDCB | 20 | 5 d | 5 d | 10 d | 2 d | 14 d | 4 d | 13 |
| P4-10 | PES | DMF | 10 | 5 d | 5 d | 8 d | 1 d | 3 d | 5 d | 20 |
| P4-11 | PES | TCE | 10 | 5 d | 5 d | 8 d | 1 d | 3 d | 5 d | 17 |
| P4-12 | PES | DMF | 20 | 5 d | 5 d | 10 d | 2 d | 14 d | 4 d | 13 |
| P4-13 | PPO | CHCl3 | 10 | 3 d | 4 d | 2 d | 0.5 d | — | 3 d | 9 |
| P4-14 | PPO | CHCl3 | 20 | 3 d | 4 d | 2 d | 0.5 d | — | 3 d | 11 |
| P4-15 | PAN | DMF | 10 | 5 d | 6 d | 6 d | 0.5 d | — | 15 d | 11 |
| P4-16 | PEI | BzNO2 | 10 | 4 d | 5 d | 5 d | 1 d | 4 d | 7 d | 11 |
| P4-17 | PEI | BzNO2 | 20 | 5 d | 5 d | 10 d | 2 d | 14 d | 4 d | 9 |
| P4-18 | PVC | NMP | 10 | 7 d | 5 d | 6 d | 0.5 d | 4 d | 4 d | 17 | h and d under Solvent displacement and Solvent exchange are hours and days, respectively.
R.T. (Room temperature) means 20° C. to 25° C..
MeOH: Methanol; t-BuOH: t-Butanol Example 5

In Example 5, the specific surface area of networked polymeric nanofibers was evaluated, using nitrogen ($N_2$) as the adsorbate.

As a pretreatment, a sample was vacuum deaerated at 70° C. for at least 12 hours, and the adsorption isotherm was measured by using a constant volume method, using $N_2$ as the adsorbate. The specific surface area was calculated according to the BET (Brunauer-Emmett-Teller) multipoint method from the $N_2$ cross sectional area of 0.162 $nm^2$, and the molecular weight of 28.0134 g/mol. Table 6 represents the specific surface areas of the polymeric nanofibers. The samples numbers in Table 6 correspond to the experiment numbers used in Examples 1 to 4. It was found from the $N_2$ adsorption experiments that the networked polymeric nanofibers used for the measurement had specific surface areas of from about 30 $m^2/g$ to about 300 $m^2/g$.

TABLE 6

Specific surface area of networked polymeric nanofibers evaluated by using $N_2$ as adsorbate

| Sample No. | Polymer | Good solvent | Concentration (wt %) | $S_A$ ($m^2/g$) [$N_2$] |
|---|---|---|---|---|
| P1-3 | PS | BzCl | 10 | 119.2 |
| P1-4 | PS | CHCl3 | 10 | 144.7 |
| P1-5 | PS | DMF | 10 | 212.9 |
| P2-1 | PS | Bz | 10 | 56.1 |
| P2-2 | PS | Bz | 20 | 67.9 |
| P2-3 | PS | Bz | 30 | 55.8 |
| P2-4 | PS | oDCB | 30 | 129.4 |
| P2-5 | PS | DMF | 30 | 176.7 |
| P2-7 | PS | BzCl | 30 | 107.7 |
| P2-8 | PS | C6H10O | 30 | 157.5 |
| P2-10 | PS | BzNO2 | 30 | 153.4 |
| P3-1 | PS | Bz | 10 | 35.3 |
| P4-1 | PC1 | CHCl3 | 10 | 122.6 |
| P4-2 | PC2 | CHCl3 | 10 | 146.7 |
| P4-3 | PC1 | CHCl3 | 20 | 156.8 |
| P4-4 | PC2 | CHCl3 | 20 | 181.5 |
| P4-5 | PSf | CHCl3 | 20 | 115.4 |
| P4-6 | PSf | DMF | 10 | 185.3 |
| P4-7 | PSf | TCE | 10 | 249.4 |
| P4-10 | PES | DMF | 10 | 177.4 |
| P4-11 | PES | TCE | 10 | 195.3 |
| P4-13 | PPO | CHCl3 | 10 | 178.8 |
| P4-14 | PPO | CHCl3 | 20 | 111.0 |
| P4-15 | PAN | DMF | 10 | 159.7 |
| P4-16 | PEI | BzNO2 | 10 | 102.9 |
| P4-18 | PVC | NMP | 10 | 59.7 |

Example 6

In Example 6, the specific surface area and the pore volume of networked polymeric nanofibers were evaluated, using carbon dioxide ($CO_2$) as the adsorbate.

Figure 4:
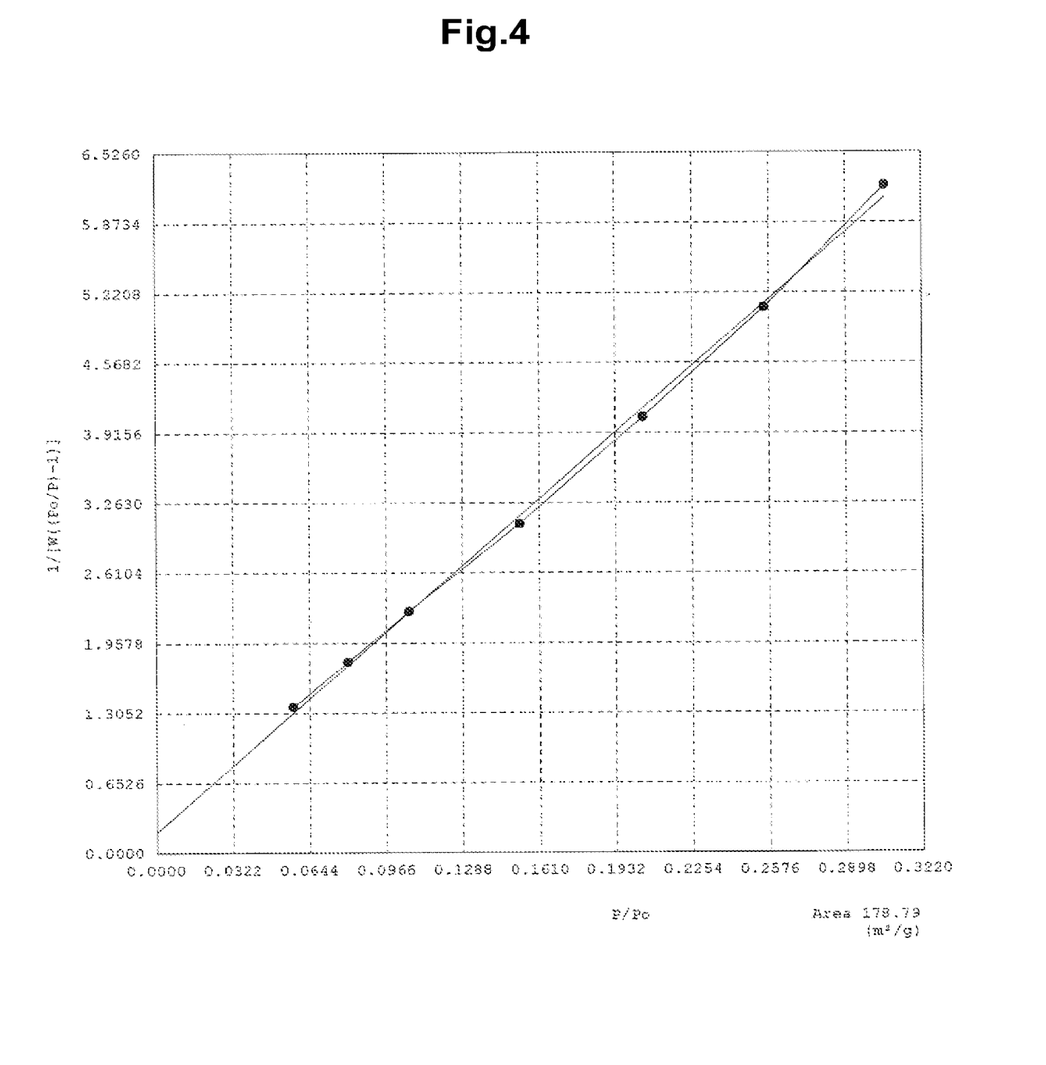
FIG. 4 represents a BET plot for a sample with experiment number P4-13.

As a pretreatment, the networked polymeric nanofibers fabricated in Examples 2 and 4 were vacuum deaerated at 70° C. for at least 12 hours, and the adsorption isotherm was measured by using a constant volume method, using $CO_2$ as the adsorbate. The saturated vapor pressure $p_0$ of $CO_2$ at 194.7 K was 101.33 kPa, and the specific surface area was calculated according to the BET multipoint method from the $CO_2$ cross sectional area of 0.216 $nm^2$, the molecular weight of 44.010 g/mol, and the adsorbate density of 1.566 $g/cm^3$. Table 7 presents the resulting specific surface areas and pore volumes. The sample numbers in Table 7 correspond to the experiment numbers used in Examples 2 and 4. FIG. 4 represents a BET plot of the sample P4-13. It was found from the $CO_2$ adsorption experiments that the networked polymeric nanofibers used for the measurement had specific surface areas of from about 100 $m^2/g$ to about 300 $m^2/g$. These values were equal to or as high as two times the specific surface areas determined by using nitrogen as the adsorbate. (For example, the specific surface area determined by using carbon dioxide as the adsorbate was 107 (Table 7), as opposed to the specific surface area of 55.8 in sample P2-3 determined by using nitrogen as the adsorbate (Table 6).) The result thus confirmed that the amorphous polymer forming the nanofibers underwent greater molecular motion at the $CO_2$ adsorption experiment temperature than at the $N_2$ adsorption experiment temperature, and had a larger adsorbable surface.

Table 7 presents the specific surface areas and the pore volumes of the networked polymeric nanofibers evaluated by using $CO_2$ as the adsorbate.

Sample numbers P2-3, P4-13, and P4-4 represent polystyrene, poly(2,6-dimethyl-p-phenyleneoxide), and polycarbonate, respectively (see Table 1 above).

TABLE 7

Specific surface area and pore volume of networked polymeric nanofibers evaluated by using $CO_2$ as adsorbate

| Sample No. | $S_A$ (m²/g) [$CO_2$] | $V_p$ (cm³/g) $CO_2$] |
|---|---|---|
| P2-3 | 107 | 0.052 |
| P4-13 | 267 | 0.14 |
| P4-4 | 187 | 0.086 |

Specific surface area: $S_A$, Pore volume: $V_p$

Example 7

In Example 7, the low-temperature $CO_2$ and $N_2$ adsorption properties of networked polymeric nanofibers were evaluated.

As a pretreatment, a sample was vacuum deaerated at 70° C. for 14 hours, and the adsorption/desorption isotherm was measured by using a constant volume method, using $CO_2$ or $N_2$ as the adsorbate. The $CO_2$ adsorption amount was evaluated at 194.7 K (at a maintained temperature using a mixture of comminuted dry ice and methanol). The $N_2$ adsorption amount was evaluated at 77 K. Table 8 presents the measured adsorption properties of the polymeric nanofibers. The sample numbers in Table 8 correspond to the experiment numbers used in Examples 2 and 4. By comparing the $CO_2$ adsorption amounts and the $N_2$ adsorption amounts in Table 8, it can be seen that the $CO_2$ adsorption weight may be several times as much as the $N_2$ adsorption weight, as in PS (sample number P2-3) and PPO (sample number P4-13).

TABLE 8

Low-temperature $CO_2$ and $N_2$ adsorption weight in networked polymeric nanofibers

| Relative pressure ($p/p_0$) | Sample No. | | | | | |
|---|---|---|---|---|---|---|
| | P2-3 | | P4-13 | | P4-4 | |
| | $W_{CO2}$ (w/w %) | $W_{N2}$ (w/w %) | $W_{CO2}$ (w/w %) | $W_{N2}$ (w/w %) | $W_{CO2}$ (w/w %) | $W_{N2}$ (w/w %) |
| 0.1 | 2.7 | 1.5 | 7.7 | 6.4 | 4.8 | 5.7 |
| 0.5 | 5.8 | 2.9 | 14.5 | 9.3 | 11.2 | 10.6 |

Adsorption weight ($W_{CO2}$ or $W_{N2}$) represents the adsorption weight ratio of adsorbate with respect to measured sample.

Example 8

In Example 8, the $CO_2$ adsorption properties of networked polymeric nanofibers at room temperature (20° C.) were evaluated.

As a pretreatment, a sample was vacuum deaerated at 70° C. at least overnight. The $CO_2$ adsorption amount was measured by using the gravimetric method. The sample (1,000 mg) was charged into a stainless-steel pressure-tight container (25 mL volume), and, after evacuation, the total weight $w_{p1}$ before adsorption was measured. Thereafter, $CO_2$ (purity of 99.99% or more) was blown into the container at a predetermined pressure (0 to 1.0 MPa) to stabilize the pressure for several minutes, and the total weight $w_{p2}$ after $CO_2$ adsorption was measured. The weight $w_p$ of the introduced carbon dioxide gas was measured from the weight change before and after the adsorption. The same measurement was made without a sample, and the weight $w_g$ of the carbon dioxide gas blown into the container under the same pressure was determined by subtracting the total weight $w_{g1}$ before the $CO_2$ introduction from the total weight $w_{g2}$ after the $CO_2$ introduction. Because the container volume decreases by the amount of the actual sample volume after the sample introduction, the decrease in container volume was calibrated by using the actual volume, which was determined as the volume $V_p$ occupied by the polymer by calculation from the added sample weight $w_p$ using the polymer density d. The actual adsorption amount $W_{CO2}$ in the polymer was determined according to the following equations.

Figure 5:
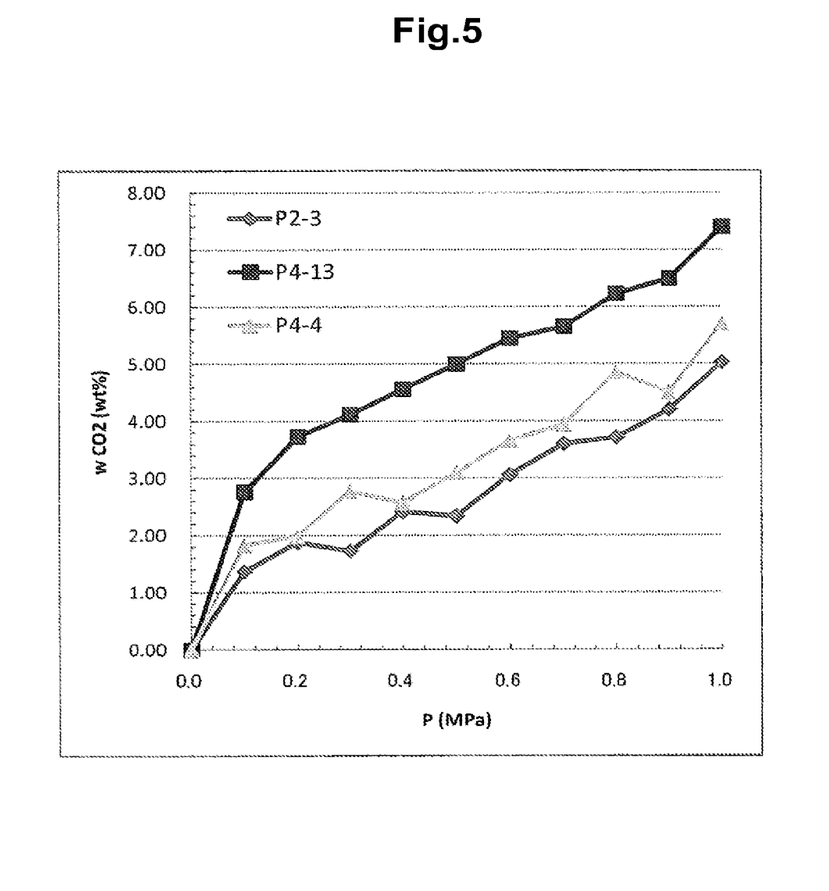
FIG. 5 is a graph representing $CO_2$ adsorption weight at room temperature.

$CO_2$ introduced amount (with sample): $w_p = w_{p2} - w_{p1}$ $CO_2$ introduced amount (without sample): $w_g = w_{g2} - w_{g1}$ Polymer volume: $V_p = w_p/d$ $CO_2$ adsorption amount: $w_{CO2} = w_p - w_g \times (1 - V_p/25)$ Table 9 presents the measured adsorption weights of the polymeric nanofibers. The sample numbers in Table 9 correspond to the experiment numbers used in Examples 2 and 4. As Table 9 clearly shows, the carbon dioxide adsorption amount increases with increasing $CO_2$ introduction pressures at room temperature, though some fluctuations are observed. FIG. 5 plots the adsorption weights presented in Table 9. Sample P4-13 had an adsorption weight of 7.4 w/w % at 1.0 MPa, and 2.76 w/w % at 0.1 MP, demonstrating that most of the $CO_2$ adsorbed under high pressure is desorbed upon returning the pressure to atmospheric pressure under experimental conditions in which adsorption equilibrium is established.

TABLE 9

Room-temperature $CO_2$ adsorption weight in networked polymeric nanofibers

| $CO_2$ introduction pressure P (MPa) | Sample No. | | |
|---|---|---|---|
| | P2-3 $w_{CO2}$ (w/w %) | P4-13 $w_{CO2}$ (w/w %) | P4-4 $w_{CO2}$ (w/w %) |
| 0.0 | 0.00 | 0.00 | 0.00 |
| 0.1 | 1.37 | 2.76 | 1.83 |
| 0.2 | 1.88 | 3.74 | 1.99 |
| 0.3 | 1.73 | 4.12 | 2.78 |
| 0.4 | 2.42 | 4.56 | 2.57 |
| 0.5 | 2.34 | 5.00 | 3.10 |
| 0.6 | 3.07 | 5.45 | 3.66 |
| 0.7 | 3.61 | 5.65 | 3.94 |
| 0.8 | 3.72 | 6.23 | 4.86 |
| 0.9 | 4.21 | 6.50 | 4.50 |
| 1.0 | 5.03 | 7.40 | 5.71 |

Adsorption weight ($w_{CO2}$) represents the adsorption weight ratio of $CO_2$ with respect to measured sample.

Example 9

In Example 9, networked polymeric nanofibers were evaluated for $CO_2$ gas adsorption/desorption rate and repeat performance at room temperature (25° C.).

$CO_2$ adsorption/desorption dynamics were measured at room temperature (25° C.) using the same measurement system used in Example 8. A stainless-steel pressure-tight container containing a sample (1,000 mg) was evacuated, and $CO_2$ was quickly blown into the container at 1.0 MPa. The total weight after $CO_2$ adsorption was measured as in Example 8, and the adsorption amount was determined. The procedure was repeated 5 times at 1-min intervals to measure the $CO_2$ adsorption dynamics. The container with the $CO_2$ adsorbed sample was evacuated, and the total weight after the $CO_2$ desorption was measured. As above, this procedure was repeated 5 times at 1-min intervals to measure the $CO_2$ desorption dynamics. The $CO_2$ adsorption-desorption cycle was repeated 3 times to evaluate the sample durability after repeated use.

Table 10 presents the sample numbers used, and the $CO_2$ adsorption amounts after 1 minute and 5 minutes in three adsorption-desorption cycles.

TABLE 10

$CO_2$ adsorption amount after 1 min and 5 min in three repeated adsorption/desorption cycle of each sample

|  |  | Sample No. P4-8 Adsorption amount (wt %) | Sample No. P4-10 Adsorption amount (wt %) |
|---|---|---|---|
| 1st cycle | $CO_2$ after 2 min | 5.0 | 6.6 |
|  | $CO_2$ after 5 min | 5.0 | 6.8 |
|  | Vacuum after 2 min | 0.0 | 0.0 |
|  | Vacuum after 5 min | 0.0 | −0.1 |
| 2nd cycle | $CO_2$ after 2 min | 4.7 | 6.4 |
|  | $CO_2$ after 5 min | 4.9 | 6.6 |
|  | Vacuum after 2 min | 0.0 | 0.0 |
|  | Vacuum after 5 min | 0.0 | −0.1 |
| 3rd cycle | $CO_2$ after 2 min | 5.1 | 6.4 |
|  | $CO_2$ after 5 min | 5.1 | 6.6 |
|  | Vacuum after 2 min | 0.0 | −0.1 |
|  | Vacuum after 5 min | 0.0 | −0.1 |

In the $CO_2$ gas adsorption, the adsorption amount quickly increased simultaneously as the $CO_2$ gas was blown into the container, and saturated in 2 minutes. In the desorption, the adsorption amount quickly decreased simultaneously as the container was evacuated, and the gas was completely desorbed in about 2 minutes. Specifically, up to 90% of the $CO_2$ saturation adsorption occurred within 1 minute, and the networked polymeric nanofibers were capable of quickly desorbing the gas when the pressure was reduced. Further, there was hardly any change in the adsorption amount after the repeated three cycles of adsorption and desorption, and the adsorption and desorption was reversible. Specifically, it was found that the material maintained the $CO_2$ gas adsorption-desorption performance even after repeated use.

Example 10

In Example 10, the vapor adsorption properties of networked polymeric nanofibers at room temperature (25° C.) were evaluated.

Sample number P2-5 in Table 4 of Example 2 was used as a sample. As a pretreatment, the sample was vacuum deaerated at 70° C. at least overnight. The vapor adsorption amount was measured by using a gravimetric method. The sample (100 mg) was sealed in a glass container with a vapor source liquid (methanol, or a toluene/methanol mixed solvent). The sample was maintained at room temperature, and exposed to vapor of a saturated vapor pressure. The sample was maintained for a predetermined time period under vapor exposure, and the total weight $w_{p2}$ of the sample was measured. The vapor adsorption weight $w_p$ was then measured from the weight change before and after the adsorption.

Table 11 presents the solvent mixture ratios, and the saturation adsorption amounts (weight percent) after predetermined time periods.

TABLE 11

Relationship between solvent mixture ratio and resulting saturation adsorption amount (wt %)

| Solvent mixture ratio (Percentage of toluene volume) | Toluene vapor pressure (mmHg) | Adsorption weight (wt %) 20 hours | Adsorption weight (wt %) After 100 hours | Adsorption weight (wt %) After 300 hours | Form of nanofibers |
|---|---|---|---|---|---|
| 0% | 0.00 | 22.9 | 20.1 | 13.7 | Retained |
| 1% | 0.11 | 33.0 | 58.5 | 109.0 | Retained |
| 5% | 0.55 | 27.4 | 48.0 | 108.0 | Retained |
| 10% | 1.14 | 35.3 | 52.3 | 75.3 | Partially destroyed |
| 15% | 1.78 | 24.7 | 19.8 | 18.0 | Disappeared |
| 20% | 2.45 | 23.1 | 23.3 | 21.7 | Disappeared |

Percentage in the table is the percentage of toluene volume

Toluene vapor pressure is the value calculated from the saturation vapor pressure at 25° C. taught in literature and from the percentage of toluene volume used in experiment.

Vapor condensed presumably because of the capillary condensation into the micropores at the initial stage of the vapor adsorption before hour 20, and the sample weight rapidly increased at all solvent mixture ratios. After 20 hours, the sample weight either decreased gradually or increased according to the solvent mixture ratio. When methanol was used (corresponding to the solvent mixture ratio 0 v % in Table 11), the sample weight slightly decreased after 100 hours, and further decreased after 300 hours. This indicates that the methanol did not permeate into the interior of the fibers, and the result coincides with the fact that the methanol is a poor solvent of polystyrene (see The Polymer Handbook used herein as reference). In this case, the size of the micropores is believed to gradually decrease with prolonged exposure. On the other hand, the sample under exposure changed from semi-transparent to transparent at toluene concentrations of 15 v % and higher, even though the solid shape was maintained. This suggests that the toluene vapor, a good solvent of polystyrene (see The Polymer Handbook used herein as reference), permeated into the polystyrene at high concentration, and dissolved the polymer and destroyed the nanofiber structure. In fact, the nanofiber structure disappeared, and a dense polymer resin with no voids was recognized in a cross sectional structure observed under SEM. When the saturated vapor was generated from a mixed solvent of 100 v % toluene, the sample completely dissolved, and assumed a liquid state. On the other hand, in adsorption experiments using low-concentration (1 to 10 v %) mixed solvents, the sample weight continuously increased until hour 300, and finally showed a large absorption weight in excess of 100 wt % at 1 to 5 v %. Despite the high vapor absorbability, the sample appearance was maintained. SEM observation also confirmed that the nanofiber structure before the vapor adsorption was maintained.

Example 11

In Example 11, the organic molecule removal properties of networked polymeric nanofibers in water were evaluated.

A sample was prepared by using the same method used in Example 2, using a 20 wt % solution of polycarbonate in cyclohexanone. The sample (0.5 g) was added to a 10 ppm pyridine aqueous solution (50 mL), and the ultraviolet absorption spectrum of the aqueous solution was measured after a predetermined time period to confirm the amount of the pyridine removed by the polymeric nanofibers.

The pyridine concentration in the aqueous solution decreased by about 30% after 1 hour, and by 47% after 4 hours from the addition of the polymeric nanofibers. Pyridine is a hydrophilic organic molecule that can mix with water at any mixture ratio. The networked polymeric nanofibers can remove even such organic molecules from a diluted aqueous solution of the organic molecules.

INDUSTRIAL APPLICABILITY

The present invention can provide materials having a considerably large specific surface area from common polymers. The present invention therefore has potential in a wide range of applications, including adsorption and absorption, and separation of various substances, removal of harmful substances, collection of useful substances, and catalyst support.

CITATION LIST

Non-Patent Documents

Non-Patent Document 1: Takashi Ochi, SEN'T GAKKAISHI, Vol. 63 (12), pp. 35 to 37, 2007, *The Investigation of nanofibers by melt-spinning*.

Non-Patent Document 2: Huang, et al., Composites Science and Technology, Vol. 63, pp. 2223 to 2253, 2003, *A review on polymer nanofibers by electrospinning and their applications in composites*.

Non-Patent Document 3: Kageyama, et. al., Science, Vol. 63, pp. 2113 to 2115, 1999, *Extrusion polymerization: Catalyzed synthesis of crystalline linear polyethylene nanofibers within a mesoporous silica*.

Non-Patent Document 4: Samitsu, et. al., Macromolecules, Vol. 41, pp. 8000 to 8010, 2008, *Effective production of poly (3-alkylthiophene) nanofibers by means of whisker method using anisole solvent: Structural, optical, and electrical properties*"

Non-Patent Document 5: Hikmet, et al., Polymer, Vol. 29, pp. 1378 to 1388, 1988, *Thermoreversible gelation of atactic polystyrene: Phase transformation and morphology*.

Non-Patent Document 6: Aubert, Macromolecules, Vol. 21, pp. 3468 to 3473, 1988, *Isotactic polystyrene phase diagrams and physical gelation*.

Non-Patent Document 7: Ma, et al., Journal of Biomedical Materials Research Part A, Vol. 46, pp. 60 to 72, 1999, *Synthetic nano-scale fibrous extracellular matrix*.

The invention claimed is:

1. A process for producing a polymeric nanofiber network consisting of amorphous polymeric nanofibers branched at multiple sites, continuously joined to one another, and having a diameter of from 1 nanometer to 100 nanometers, the process comprising the steps of:
   (a) dissolving an amorphous polymer in a solvent consisting of a good solvent of the amorphous polymer to obtain a polymer solution, wherein the good solvent is capable of providing a homogeneous solution even under cooling and does not cause phase separation until the good solvent solidifies, and wherein the good solvent is one or more compounds selected from the group consisting of carbon tetrachloride, chlorobenzene, chloroform, cyclohexanone, o-dichlorobenzene, dimethylformamide, 1-methyl-2-pyrrolidone, nitrobenzene, 1,1,2,2-tetrachloroethane, and p-xylene;
   (b) rapidly freezing the amorphous polymer solution to form a nanoscale phase-separation structure of the polymer and solidified good solvent molecules, wherein the good solvent of the nanoscale phase-separation structure is solidified at nanoscale by the rapid freezing, and wherein the good solvent does not exist in a liquid state around the amorphous polymeric nanofibers while the amorphous polymeric nanofibers are being formed; and
   (c) removing the good solvent from the frozen amorphous polymer solution to achieve the polymeric nanofiber network, wherein the step of removing the good solvent includes a step of displacing the good solvent with a poor solvent of the amorphous polymer by contacting the frozen amorphous polymer solution with the poor solvent, which has been cooled in advance.

2. The process according to claim 1, wherein the poor solvent is methanol.

3. The process according to claim 1, wherein the solvent displacing step includes a step of increasing temperature in a stepwise manner.

4. The process according to claim 1, wherein the step of removing the good solvent further includes a step of performing solvent exchange.

5. The process according to claim 4, wherein the solvent exchange is performed by using the poor solvent or butanol.

6. The process according to claim 1, wherein the step of removing the good solvent further includes a step of performing freeze drying, or vacuum drying at a temperature no greater than the glass transition point of the amorphous polymer.

7. The process according to claim 1, wherein the amorphous polymer is selected from the group consisting of polystyrene, polycarbonate, poly(2,6-dimethyl-p-phenyleneoxide), polysulfone, poly(p-phenylene ether-sulfone), polyacrylonitrile, polyetherimide, polyvinyl chloride, and a mixture thereof.

\* \* \* \* \*